United States Patent [19]

Friday et al.

[11] Patent Number: 5,211,848
[45] Date of Patent: May 18, 1993

[54] PROCESS FOR THE MICROBIAL DETOXIFICATION OF TOXIC STREAMS

[75] Inventors: David D. Friday; Ralph J. Portier, both of Baton Rouge, La.

[73] Assignee: Board of Supervisors of Louisiana State University Agricultural and Mechanical College, Baton Rouge, La.

[21] Appl. No.: 759,046

[22] Filed: Sep. 5, 1991

Related U.S. Application Data

[62] Division of Ser. No. 519,793, May 7, 1990, abandoned.

[51] Int. Cl.$^5$ ............................................. C02F 3/10
[52] U.S. Cl. .................................... 210/611; 210/617; 210/909
[58] Field of Search ............... 210/610, 611, 612, 613, 210/614–618, 620, 624, 631, 150, 151, 177, 180, 194, 203, 908, 909; 435/240.23, 240.24, 284, 288, 299, 313, 818

[56] References Cited

U.S. PATENT DOCUMENTS

| | | | | |
|---|---|---|---|---|
| 3,960,657 | 6/1976 | Bowley | ............................. | 435/818 |
| 4,627,917 | 12/1986 | Morper | ............................. | 210/617 |
| 4,810,377 | 3/1989 | Kato et al. | ............................. | 210/150 |
| 4,833,083 | 5/1989 | Saxena | ............................. | 210/617 |
| 4,954,257 | 9/1990 | Vogelpohl et al. | ............................. | 210/617 |
| 5,037,551 | 8/1991 | Barkley et al. | ............................. | 210/612 |
| 5,051,184 | 9/1991 | Taylor | ............................. | 210/909 |
| 5,057,221 | 10/1991 | Bryant et al. | ............................. | 210/617 |

*Primary Examiner*—Thomas Wyse
*Attorney, Agent, or Firm*—Llewellyn A. Proctor; John H. Runnels

[57] ABSTRACT

A continuous flow, immobilized cell reactor, and bioprocess, for the detoxification and degradation of volatile toxic organic compounds. The reactor is closed, and provided with biocatalysts constituted of specific adapted microbial strains immobilized and attached to an inert porous packing, or carrier. A contaminated groundwater, industrial or municipal waste, which is to be treated is diluted sufficiently to achieve biologically acceptable toxicant concentrations, nutrients are added, and the pH and temperature are adjusted. The contaminated liquid is introduced as an influent to the closed reactor which is partitioned into two sections, or compartments. Air is sparged into the influent to the first compartment to mix with and oxygenate the influent with minimal stripping out of the toxic organic compounds. The second section, or compartment, is packed with the biocatalyst. The oxygenated liquid influent is passed through the second compartment substantially in plug flow, the biocatalyst biodegrading and chemically changing the toxic component, thereby detoxifying the influent. Non toxic gases, and excess air from the first compartment, if any, are removed through a condenser located in the overhead of the reactor. Liquids are recondensed back to the aqueous phase via the condenser.

9 Claims, 4 Drawing Sheets

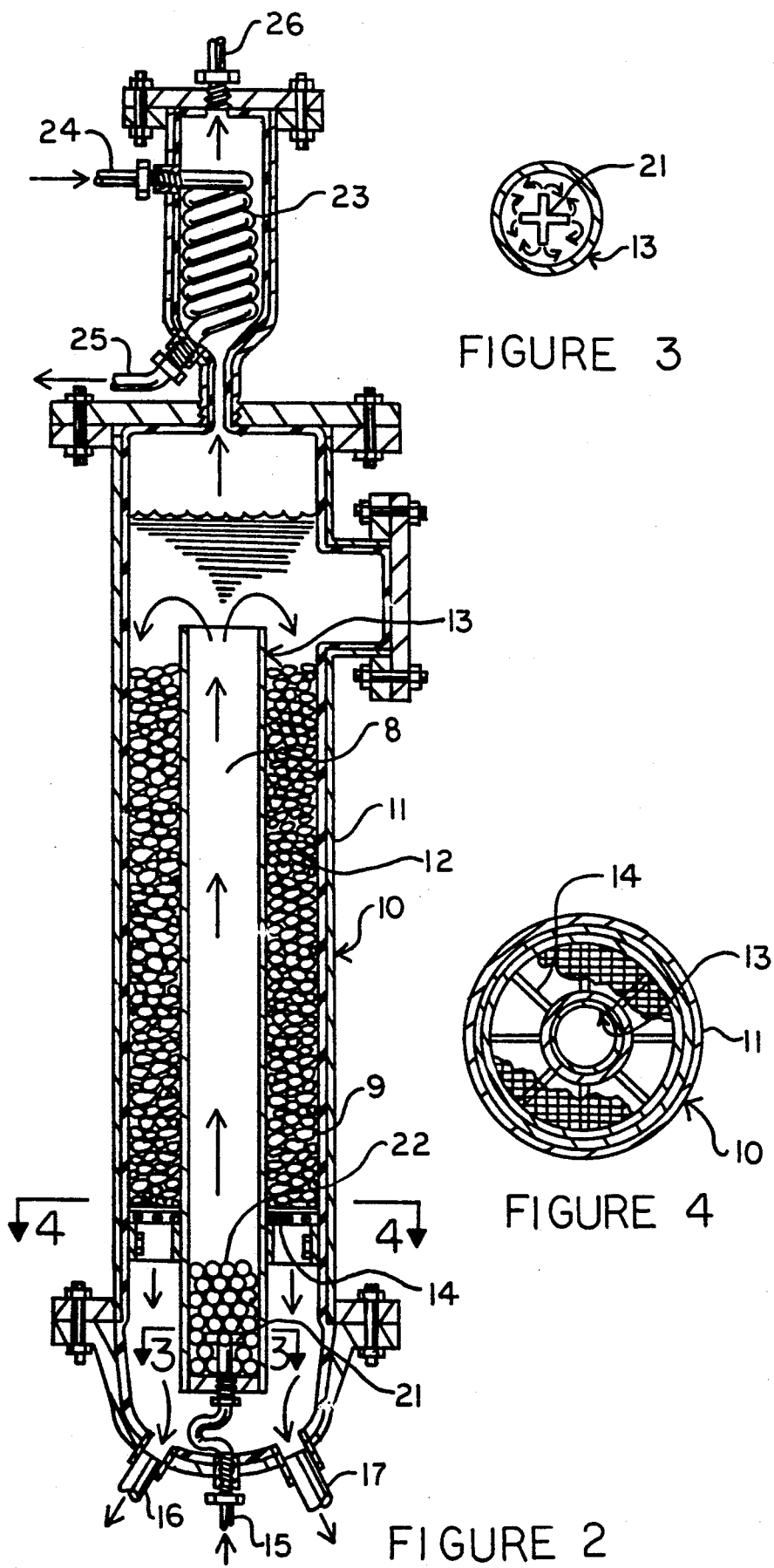

CHLORIDE CONCENTRATIONS IN CONTINUOUS FLOW OPERATION

EDC CONCENTRATIONS IN CONTINUOUS FLOW OPERATION

PROCESS FOR THE MICROBIAL DETOXIFICATION OF TOXIC STREAMS

This is a divisional of copending application Ser. No. 07/519,793, filed May 7, 1990, now abandoned.

FIELD OF THE INVENTION

This invention relates to an immobilized cell reactor, and bioprocess, for the degradation of toxic organic compounds. In particular, it relates to a continuous flow immobilized cell reactor, and bioprocess, for the removal of volatile, toxic organic compounds from contaminated aqueous liquids, and detoxification of same.

BACKGROUND

Organic chemicals of wide variety and increasing complexity are daily entering the biosphere, and they are doing so at unprecedented rates. Populations in the developed countries have reaped the benefits of a wide range of chemical products, but pollution and the necessity to efficiently, and effectively detoxify the chemical waste presents severe technological problems. Organic pollutants from diverse agricultural, municipal and industrial facilities, and waste sites partition preferentially into the soil, water or air phases and spread rapidly throughout the environment. Many of these materials, even in small concentrations, adversely affect life forms, and create serious environmental threats. Toxicity, carcinogenicity, and mutagenicity are the most critical biological properties of a potential pollutant, a very large number of organics of which have been identified by the U.S. Environmental Protection Agency as particularly threatening. For example, the widespread use over the last few decades of herbicides, pesticides and related high risk chemicals, e.g., organochlorines, polychlorobiphenyls (PCB's) and chlorinated phenols, have resulted in serious environmental problems.

Enzymes have been proposed as possibly useful in the treatment of toxic wastes of this type. Enzymes are biocatalytic materials known to possess extraordinary high efficiency, and enzymes of one type or another can be used to catalyze almost any chemical reaction without producing harmful substances. The successful use of enzymes to biotransform and biodegrade these toxic materials into harmless substances, however, has met with limited success. This is largely due to their failure to biodegrade these materials within an acceptable time frame. Also, a given enzyme can catalyze only a single reaction. The mineralization of most known toxic compounds however requires a complex multi-step series of reactions which must be carried out with the aid of a biochemical contactor, which in turn must be continuously regenerated by a cell (or continuously added to the reaction mixture).

Recently issued U.S. Pat. Nos. 4,775,650 and 4,882,066 disclose contact materials for the detoxification of streams containing toxic chemicals. The '650 and '066 patents disclose the use of porous solids on the surfaces of which thin films of chitinous material are dispersed. These materials, on contact with a stream containing, e.g., a toxic halogenated organic compound, at appropriate conditions, complex with and remove the toxic organic compounds from solution. In U.S. Pat. No. 4,859,594 there is disclosed a biocatalytic composition wherein microorganisms are immobilized and attached to porous solid supports. These biocatalysts, on contact at appropriate conditions with a solution containing a toxic halogenated organic compound produce reaction and degradation of the halogenated organic compound component to detoxify the solution. Whereas the contact materials described by these several patents, particularly the biocatalysts described in the '594 patent, have proven admirably effective in detoxifying liquids containing toxic halogenated organic compounds, there nonetheless remains a need for improving the performance of processes utilizing these, and other materials for use in the decontamination and detoxification of toxic streams of these types. There also exists a need for reactors of improved design for carrying out these reactions due to the volatility of many of the chemical toxicants targeted for detoxification biodegradation.

OBJECTS

It is, accordingly, a primary objective of this invention to provide an improved process for the detoxification of aqueous streams containing toxic volatile organic compounds, notably toxic volatile halogenated organic compounds.

In particular, it is an objective to provide a process employing biocatalysts comprised of immobilized microorganisms, of preselected specificity attached to a support to detoxify and biodegrade toxic materials associated with industrial and municipal effluents, emissions, ground water and other aqueous discharges.

A further and more specific object is to provide both process and apparatus, for use in the continuous detoxification of toxic streams at conditions which provide optimum or near-optimum detoxification of the toxic streams.

THE INVENTION

These objects and others are achieved in accordance with this invention, which embodies, generally:

(i) a process wherein in a first zone, or stage, a stream containing a toxic volatile organic compound, diluted as necessary with water and provided with nutrients to optimize the concentration of the toxic organic compound and nutrient concentration for microbial attack by selected microorganisms having a high metabolic uptake rate, is contacted under pressure with an oxygen-containing gas, suitably air, and oxygenated, and the oxygenated stream under pressure at preselected pH and temperature is then contacted, in a second zone, or stage, with a packed bed of a biocatalyst constituted of immobilized microorganisms attached to a support, or carrier to detoxify the stream; and (ii) a closed compartmented reactor within which said process can be effectively conducted.

In the initial step, or phase of the process operation, foreign solids particulates may be removed, if necessary, from the contaminated raw aqueous liquid, e.g., via filtering. The liquid, from which particulate solids have been removed, can then be diluted with water to the degree necessary to provide biologically acceptable toxicant concentrations for the immobilized microorganisms of the catalyst selected to carry out the microbial attack. Nutrients (e.g., K, P, N) such as are needed to provide the energy and growth of the selected microorganisms are added, and the temperature of the liquid is adjusted. An acid, e.g., a mineral acid such as HCl, or a base, e.g., NaOH, is added as may be required to adjust the pH of the liquid to that at which the reaction is to be conducted. In general, the temperature of the contaminated liquid fed into the reactor is adjusted to, and maintained within, a range from about 25° C. to about 35° C., preferably from about 28° C. to about 32° C., and pH ranging from about 6 to about 8, preferably from about 6.8 to about 7.2, dependent largely on the specific nature of the microorganisms used to form the biocatalyst employed in the packed bed portion of the reactor.

The reactor into which the conditioned influent is fed is operated under pressure and provided with two distinct zones, or sections. Each of the two zones is operated under pressure, in a closed flow systems, suitably at pressure ranging from about 15 pounds per square inch gauge (psig) to about 50 psig, preferably from about 30 psig to about 40 psig, dependent also on the specific nature of the organism. In the first zone, or section, air, oxygen or other oxygen-containing gas is sparged into the entering conditioned liquid influent to mix with, aerate and oxygenate the influent. The oxygen-containing gas, preferably air, is always combined with the liquid at conditions which creates very fine gas bubbles, bubbles of average diameter ranging from about 0.10 millimeters (mm) to about 3 mm, preferably from about 0.25 mm to about 1 mm, sufficient to obtain good mixing while simultaneously minimizing stripping the toxic organic compounds from the liquid. Preferably, the gas and conditioned liquid are brought together and the mixing thereof initiated in advance of the input of the influent mixture into the first zone of the reactor, these components being brought together at high velocity and subsequent high gas/liquid shear conditions. Suitably, the gas, measured at standard conditions, is brought together with the conditioned liquid in gas:liquid volumetric ratios ranging from about 1:20 to about 1:5, preferably from about 1:12 to about 1:8. The mixing is carried out under pressure to increase the oxygen driving force, and at high gas shear rates to minimize bubble diameter and increase interfacial transfer area between the phases. By small bubble formation and good mixing with good air/liquid contact at elevated pressure, the volume of air that is introduced to the unit is minimized; and consequently a lesser amount of volatiles are stripped from the liquid. In the second zone, or section, the oxygenated liquid is passed in plug flow through a bed packed with a biocatalyst, or porous carrier to which selected microorganisms are attached and immobilized, to biodegrade and chemically change the toxic component, thereby detoxifying the liquid. In its preferred aspects, the conditioned influent is passed commingled with a high velocity jet of oxygen—containing gas, and subsequently the mixed phases are flowed through a bed packed with a solid inert packing, e.g., glass beads, to create high shear conditions. The finely dispersed mixed phase stream is then passed, preferably upwardly, through a tubular column which stands vertically, and concentrically within a larger diameter column to which it is communicated, the larger column containing a packed bed, or beds, of the biocatalyst. The conditioned influent to the inner tubular column, constituting the first reactor zone, or compartment, is passed therethrough, preferably upwardly, and oxygenated with minimal or no agitation, with a minimized volume of an oxygen-containing gas, resulting in a minimum rate of stripping of the volatile, toxic organic compounds. The oxygenated conditioned influent, on exit from the downstream end of the smaller diameter tubular column passes into and through the packed bed, the second reactor zone, or compartment, without effervescence or bubbling, suitably by overflow from the small diameter tubular column and is then downflowed plug flow through the annulus between the internal and external wall surfaces, respectively, of the two columns. Non toxic by-product gases from the biochemical reaction which occurs within the packed bed, or excess gas from the first compartment, if any, are passed upwardly through a condenser and removed as off gases from the top of the reactor, and dumped or clarified prior to release to the environment. The reactor is instrumented to monitor and control pH, temperature (T), pressure (P), and dissolved oxygen (DO) levels.

The process, and reactor, and the principles of operation of the process and reactor will be more fully understood by reference to the following detailed description, and to the drawing to which reference is made in the description, depicting a preferred process, and reactor. The various features and components in the drawing are referred to by numbers, similar features and components being represented in the different views by similar numbers. Subscripts are used in some instances with numbers where these are duplicate parts or components, or to designate a sub-feature or component of a larger assembly.

REFERENCE TO THE DRAWING

In the drawing:

FIG. 2 depicts a cross-section of the reactor as described in the preceding figure.

FIG. 3 depicts a view taken through Section 3—3 of FIG. 2.

FIG. 4 depicts a view taken through Section 4—4 of FIG. 2.

Figure 1:
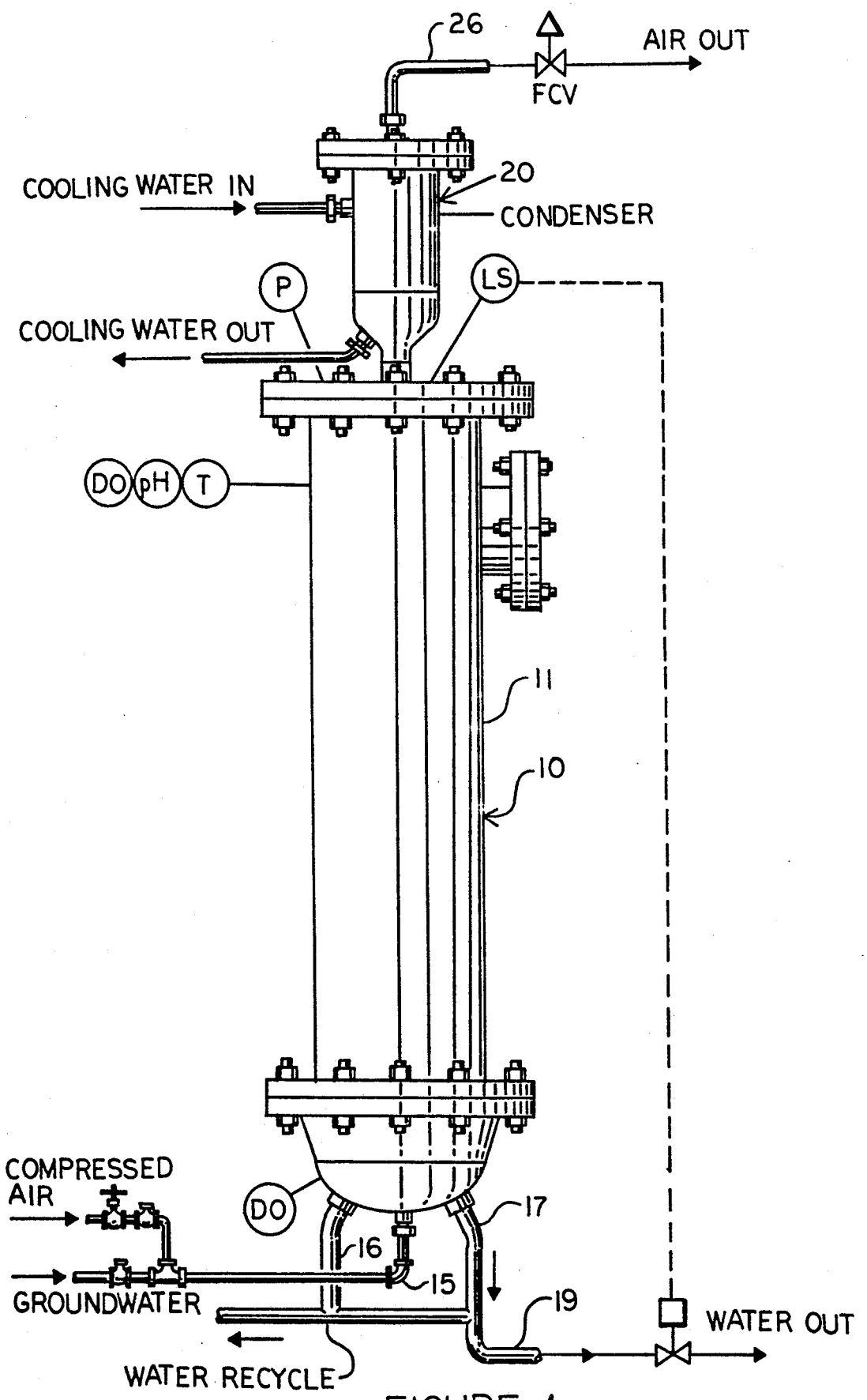
FIG. 1 depicts in perspective a sectional side elevation view of the reactor, the reactor constituting the focus of the process unit.
Figure 5:
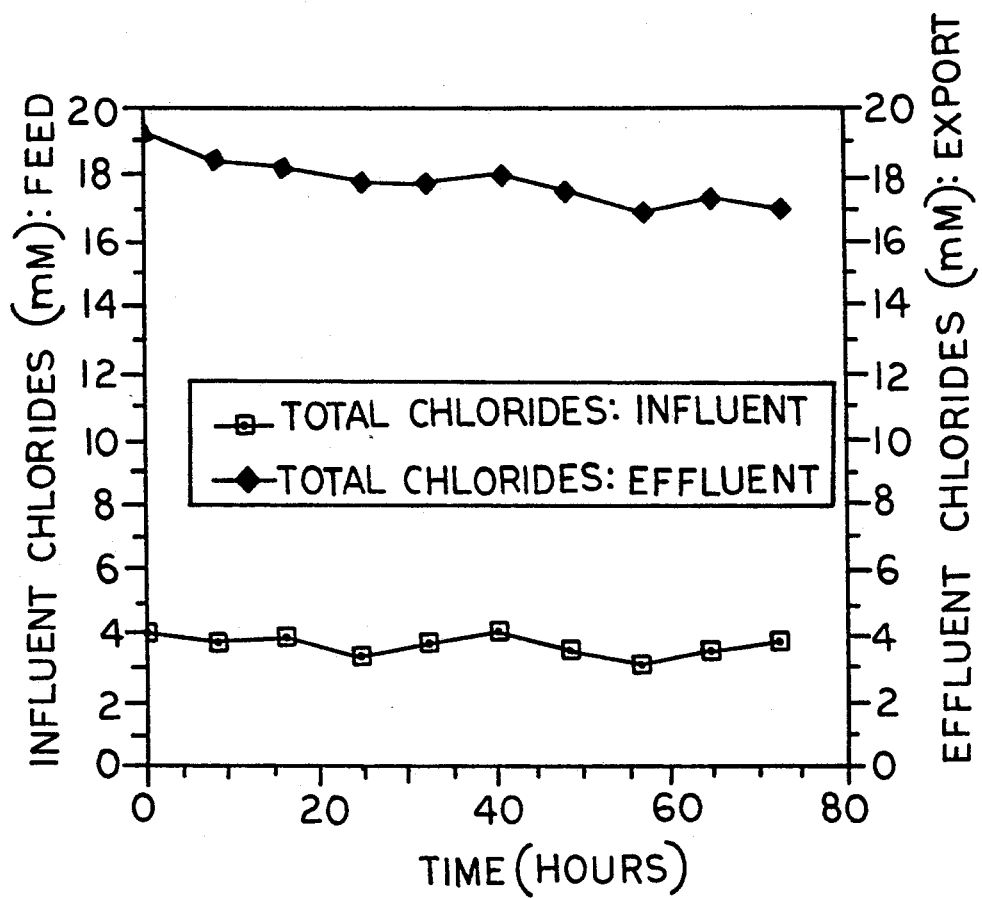
FIGS. 5 and 6 are graphical illustrations of the data exemplified hereafter.
Figure 6:
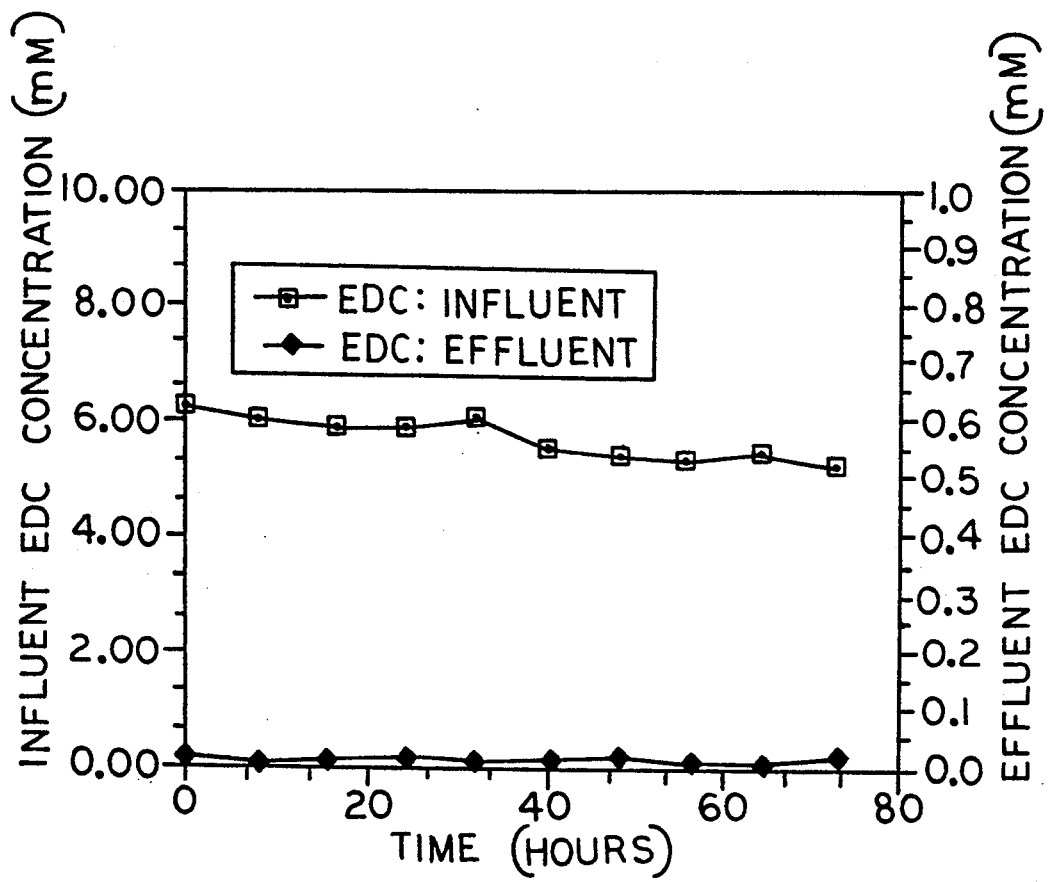

The unit is constituted generally of an instrumented compartmented bioconversion reactor, storage reservoirs for pH adjustment, interconnecting piping and valve manifold, pumps, thermostats and flow control regulation devices, and a free-standing control panel which houses process monitoring devices and signal conditioning electronics. For simplification most of these components of the unit other than the reactor are not shown, or are illustrated schematically. Referring to the drawings, notably FIG. 2, at the heart of the unit lies the bioconversion reactor 10, a vertically oriented compartmented vessel of elongate shape which includes an outer compartment 9, or annular section packed with a particulate biocatalyst composition, located within the surrounding outer side wall 11 of the reactor, and an inner compartment 8 located within the enclosing wall 12 of a vertically erected tubular shaped vessel 13 concentrically located within the surrounding wall 11 of of the larger vessel. Thus, a first packed section or compartment is formed between the internal face of the outer enclosing side wall 11 of the large diameter vessel and external face of the wall 12 of the smaller diameter tubular shaped internal bubble column concentrically mounted within the vessel. The outer compartment 9 is located downstream from compartment 8 provided by the internal volume inside the surrounding wall 12 of the internal bubble column 13. The inside wall 11, and if desired both the inside and outside faces of the wall 12 of the internal bubble column 13, both of which are suitably constructed of a metal, e.g., steel, are coated with a material, e.g., a baked phenolic resin coating, to suppress corrosion and biological interaction. The inside corners of the vessel are rounded to facilitate acceptance of the protective coating, and ports are provided for the continuous injection and removal of liquid or gaseous streams, and for the installation of sensors for monitoring pH, dissolved oxygen, temperature, pressure, and the like.

The lowermost end of the internal bubble column 13 may be, and preferably is, provided with non-reactive beads, e.g., ceramic or glass beads, to aid in shearing the gas and creating small bubbles in the conditioned liquid influent entering via line 15 into the reactor. The internal bubble column 13, which except for the ceramic or glass beads contains no packing of any kind, is mounted vertically, and supported on the coated cross-piece 14, an open metal frame covered with a coated wire mesh. A fluid, e.g., contaminated ground water, entering via line 15 continuously into the bottom of the reactor is passed upwardly through the open center of the internal bubble column 13, overflowing the open top of the internal bubble column 13 to flow downwardly through the annular biocatalyst packed section 9 to the bottom of the reactor 10, from which the treated stream is removed via lines 16, 17. A portion of the treated stream is preferably recycled with the influent of fresh feed to increase the fluid retention time and control the extent of toxic compound conversion within the reactor. Suitably, the retention time of the liquid within the reactor ranges from about 8 hours to about 36 hours, preferably from about 20 hours to about 28 hours. High recycle rates of the treated stream:fresh feed are preferred, the recycle rate of the treated stream:fresh feed ranging from about 10:1 to about 100:1, preferably from about 50:1 to about 75:1.

The reactor is pressurized by the sparge gas sufficiently that on the introduction into the reactor of an organics-containing, or gas or vapor-containing, aqueous liquid, as found e.g., in contaminated ground water or in an industrial or municipal stream, the organics or gas and vapor will be maintained in or solubilized back into the aqueous phase. The pressure also regulates and controls the amount and transfer rate of dissolved oxygen to the immobilized biomass or biocatalyst bed, this permitting optimal oxygen transfer to the entrenched biomass with minimal attrition or damaging of the carrier bed during operations. Bed life is promoted, providing a biocatalytic unit having an operational life measured in years rather than in months, or weeks as generally occurs in conventional processing. In general, the total pressure maintained on the reactor during operation ranges from about 15 psig to about 50 psig, preferably from about 30 psig to about 40 psig.

The height:diameter of the internal bubble column 13 ranges from about 5:1 to about 20:1, preferably from about 8:1 to about 12:1, this providing adequate contact time between gas and liquid to obtain good contact efficiency and gas shear. This, and the thorough mixing and oxygenation of the liquid with oxygen on entry into the column, is beneficial from the standpoint of oxygen transfer from gas to liquid. In other words, stripping is minimized to maintain toxic volatile organics as a substrate in the aqueous phase under aerobic conditions.

Gas and liquid enter the internal bubble column 13 via line 15 and is dispersed radially outwardly via the outlet 21 as best shown by reference to FIG. 3. The outlet 21 is provided with four nozzles each horizontally directed at right angles one nozzle outlet respective to another. The gas and liquid ejected from the nozzles is subjected to a high shearing action by the beads 22 on the mixed phase fluid, the gas rising as very fine bubbles within the liquid of the internal bubble column 13. A liquid level control LS maintains the level of the liquid in reactor 11, the water being removed from the bottom of the reactor via line 19. Liquid flows continuously downwardly through the annular packed bed 12 and is removed from the reactor via lines 16, 17. Gas rises into the overhead condenser 20 of the reactor, condensate being returned to the liquid surface of the reactor on contact with the copper coils, cooled via liquid coolant entering therein via line 24 and exiting therefrom via line 25. Gas passes out of the overhead of the reactor via line 26.

The biomass, or biocatalyst in the second compartment, or annular zone 9 of the reactor is supported upon the coated cross-piece 14, the details of which are best shown by reference to FIG. 4. The cross-piece 14 is constituted of an open double circular frame structure, with cross-supports to provide strength, covered with a wire mesh. It supports the solid biocatalyst and permits the passage of liquid therethrough. The height of the bed extends continuously from the upper surface of the supporting cross-piece 14 up to a level just below the exit side of the internal bubble column 13, and the microorganism immobilized and attached to the surface of the catalyst support is selected, with the conditions of operation imposed thereon, to drive the reaction to produce maximum breakdown of the toxic organic compound, or compounds, to non-toxic components. The liquid in the reactor is maintained and controlled by a level controller LS, at a level above the upper surface of the bed; liquid influent being continuously added to the reactor via line 15, and withdrawn from the bottom of the reactor via lines 16, 17. Liquid effluent withdrawn from the bottom of the reactor via lines 16, 17, are reconditioned by readjustment of the dilution factor, nutrient concentration, temperature and pH, and then oxygenated and recycled to the reactor.

Streams containing a wide variety of toxic organic compounds can be detoxified pursuant to the practice of this invention, particularly compounds having Henrys' Law Constants ranging from 0.025 dimension less mole fraction, and greater. These include aliphatic aromatic hydrocarbons, and the halogenated derivatives thereof a large number of which are listed on the EPA List of Priority Pollutants. [Keith L. H. and Telliard W. A., Priority Pollutants, a Perspective View, *Environmental Science and Technology*, Vol. 13, pp. 416–423 (1979).]

With the preferred biocatalysts the half-lives of most toxic volatile organic, or toxic volatile halogenated organic compounds will rarely exceed one day, and most will range between about 4 hours and 16 hours. It has been found that such organic compounds as benzene, toluene, ethyl benzene and xylenes, or such halogenated organic compounds as, e.g., 1,1-dichloroethane, 1,2-dichloroethane, methyl chloroform, 1,1,2,2-tetrachloroethane, hexachloroethane, bromoethane, and 1,2-dibromoethane, respectively, contained in a conditioned liquid can be 99.9%, by weight, converted to non-toxic products at a total reactor residence time ranging below one day via the use of biocatalysts utilizing immobilized microorganims of a select class which can metabolize the organic or halogenated organic compounds as carbon and energy sources, e.g., a strain of *Xanthobacter autotrophicus*. *Xanthobacter autotrophicus* is member of a known biologically unique group of bacteria which have the ability to grow chemolithoautotrophically in gas atmospheres containing hydrogen, oxygen and carbon dioxide. These are species which are able to obtain energy from the oxidation of hydrogen and concomittantly synthesize cell material by the reductive assimilation of carbon dioxide via the ribulose bisphosphate cycle as used by plants to produce biomass.

The preferred biocatalysts of this invention are prepared by fixing a selected microorganism to a porous solid surface, preferably a porous particulate solid carrier, or support. Higher culture densities can be obtained by immobilization of the microorganisms than, e.g., suspended cell systems, and high flow rates are feasible since washout cannot occur when the microorganism is immobilized. The selection of the carrier can affect the performance of a biocatalyst in the practice of this invention since pore dimensions and surface characteristics govern both the degree of biological colonization and transport of substrate and metabolic products. Biocatalysts useful in the practice of this invention, and methods for their preparation, both in terms of suitable microorganisms and carriers, and technique for immobilization and attachment of a selected microorganism to a support, are described, e.g., in U.S. Pat. Nos. 4,775,650 and 4,882,066, supra; and particularly U.S. Pat. No. 4,859,594, supra; the disclosures of each of which is herewith incorporated and made of record. The use of a chitinous substrate deposited on a porous solid substrate, as described, e.g., in U.S. Pat. No. 4,775,650, makes the surface particularly favorable for biological colonization. The following lists preferred microorganisms, and preferred porous solid substrates upon which the microorganisms can be immobilized and attached, to form a select class of biocatalysts for use in the practice of this invention, to wit:

TABLE

| Microorganism | Identifying Number | Substrate |
| --- | --- | --- |
| Xanthobacter autotrophicus | ATCC-43050 | Diatomaceous earth |
| Pseudomonas fluorescens | ATCC-55360 | Diatomaceous earth |
| Pseudomonas cepacia | ATCC-55362 | Diatomaceous earth |
| Pseudomonas fluorescens | ATCC-55361 | Diatomaceous earth |

Strain ATCC-43050 is a publicly available strain. Samples of each of the other three strains listed above, ATCC-55360, ATCC-55362, and ATCC-55361, were deposited with the patent depository of the American Type Culture Collection (ATCC), 12301 Parklawn Drive, Rockville, MD 20852 on Sep. 18, 1992, and were assigned the accession numbers stated above. These deposits were made pursuant to contracts between ATCC and the assignee of this patent application, Board of Supervisors of Louisiana State University and Agricultural and Mechanical College. The contracts with ATCC provide for permanent availability of the progeny of these strains to the public on the issuance of the U.S. patent describing and identifying the deposits or the publication or the laying open to the public of any U.S. or foreign patent application, whichever comes first, and for availability of the progeny of these strains to one determined by the U.S. Commissioner of Patents and Trademarks to be entitled thereto according to 35 U.S.C. § 122 and the Commissioner's rules pursuant thereto (including 37 C.F.R. §§ 1.14 and 1.801 et seq., with particular reference to 886 OG 638). The assignee of this application has agreed that if any of the strains on deposit should die or be lost or destroyed when cultivated under suitable conditions, it will be promptly replaced on notification with a viable culture of the same strain.

These porous solid substrates, as indicated, provide a surface on which whole cells can be attached in forming a biocatalyst. Suitable solid surface substrates to which these, and other microorganisms can be attached to form biocatalysts are described e.g., in U.S. Pat. No. 4,882,066 at Column 3, lines 12-34, herewith incorporated by reference and made part of this disclosure. The biocatalyst is packed into the reactor and used in a steady state operation. Since the population remains in place within the reactor, a stable culture is continuously contacted with a sterile inlet feed. There is no necessity of separating a fluid from a solid phase, since the catalyst bed is fixed in place; and there is minimal backmixing. The rates of flow of the air (oxygen) and the conditioned liquid are set to maintain the dissolved oxygen (DO) concentration above some minimum necessary to the function of the selected microorganism up to a level at which the selected microorganism can function to decompose the toxic substance in the liquid influent. Preferably the flow rates are set at a level to supply the amount of oxygen which is optimum to the function of the selected microorganism; which for some microorganisms may be the point of saturation of the conditioned liquid influent with oxygen. In general, the concentration of oxygen in the conditioned liquid influent ranges from about 0.1 mg/L to about saturation, preferably from about 5 mg/L to about 6 mg/L, dependent upon the microorganism. The reactor operating pressure is controlled by regulating the pressure, P, at which the sparge gas is delivered to the reactor. Oxygen concentration is increased by raising the air delivery pressure, and can also be increased by admixing pure oxygen in the sparge gas supply. Overpressure can be controlled by relief valves on the influent line or reactor, or both. The flow rate of the contaminated liquid influent, or feed water, and recycle flow to the reactor, can be controlled by the pumping rates.

The following is illustrative, and exemplifies a preferred mode for conducting the process, in a preferred type of reactor, as employed in the practice of this invention. The reactor employed is that described by reference to FIGS. 1-4. All parts are in terms of weight, except as otherwise expressed. Pressure is given in terms of pounds per square inch absolute, temperatures are given in terms of degrees centigrade, and flow rates in terms of liters per minute, L/min.

EXAMPLE

A unit, with reactor, as described by reference to the figures, was employed to treat a ground water contaminated with ethylene dichloride, $CH_2ClCH_2Cl$, a widely commercially produced organic halide which is a suspected carcinogen, and has been demonstrated to be both mutagenic and tumorigenic. It is a remarkably persistent compound with an estimated half-life due to abiotic hydrolysis of approximately 50 years. The ethylene dichloride, EDC, was present in the liquid in concentration of 600 mg/L. The flow rate of the reactor was set slightly below the inlet rate by a manual control valve, and liquid accumulation in the reactor avoided by a two-position level switch which maintained the liquid level within acceptable limits. System pressure was maintained constant by a sparge air regulator set to increase the air supply rate as the gas headspace within the top of the reactor increased.

pH was controlled by adding concentrated acid or base reagents to the recycle stream as needed. If the pH sensed in the reactor dropped below a low set point or exceeded a high set point, the appropriate valve on the acid or base reagent tank was opened for some preset time interval. Reagent tank pressure was set slightly above the recycle line pressure to create a positive hydrostatic head.

Reactor off gases are dehydrated, and reactor concentration slightly reduced, by the operation of the condensing unit in the head space. Cooling fluid was circulated through a copper tubing, which caused condensation and reflux of water from the saturated air passing across the coils. Exit gas was droplet free, reducing the risk of ingesting or inhaling airborne bacteria from the process.

The reactor, as described, was fitted with a concentric internal tube which partitioned the inner volume into two distinct sections. In the first, air was sparged into the recirculation loop to mix with and aerate the influent water. The tube volume was unpacked, and thus functioned as a bubble column, promoting the efficient transfer of oxygen to the broth. Admixed air separated by density from the water before it entered the second reaction stage. Fluid exiting the top of the column flowed in a downward direction through the annular space between the inner tube and vessel interior wall. The annular space was packed with a selected biological support and when the microorganism was incorporated therewith, it functioned as a fixed biocatalytic bed. The support was an R-630 Celite Biocatalyst Carrier, manufactured by Manville, having a B.E.T. surface area of 1.3 $m^2$/gm. A mass of 12.76 kg was used to provide a bed density of 0.3364 gm/$cm^3$. A recycle pump took suction from the bottom of the reactor, drawing fluid through the bed as it did so. A recycle pump discharged fluid back into the reactor at the base of the tube, completing the fluid circuit. By adjusting the recycle flow rate, both the dispersion and oxygenation characteristics of the system were adjusted.

In a sterilize mode, steam source was connected directly into the recirculation line. Admixing steam into the nutrient-amended groundwater greatly increased the rate of approach to sterilization temperature (120 deg. Centigrade). This action had the effect of diluting the initial concentration of nutrient and substate constituents. During sterilize mode, the headspace pressure was maintained at 50 psig, which avoided boiling. This condition was maintained a minimum of twenty minutes to achieve a complete biological kill. The selected biocarrier was capable of withstanding the sterilization conditions, so the packing was loaded into the vessel and sterilized along with the nutrient amended groundwater. Once the water cooled to about 30 deg. Centrigrade, a biological inoculum was introduced through a port in the headplate. Sparge air filtered through a 0.45 micron filter provides a sterile air supply to the jet sparger. The broth was then circulated through the vessel over a 30–40 hour period to develop the culture and allow adequate time for it to partition onto the support.

Eighteen hours after thermal sterilization, the reactor was innoculated with 3 L of an axenic *Xanthobacter autotrophicus* culture. 1.5 L of a sterile nutrient solution was added, along with 100 mL of sterile vitamin concentrate. Recirculation flow rate was set at approximately 4 L/min. Compressed air was introduced at the base of the well-mixed section of the reactor at approximately 500 standard cc/min. The reactor operating pressure was regulated to 30 psig and temperature was controlled at 30 deg. C. The pH of the groundwater was automatically maintained between 6.5 and 7.5 by addition of 1M sodium hydroxide solution. Twenty hours later, the tubidity within the reactor was high enough to obscure all internal reactor components located below the air/liquid interface.

Contaminated groundwater was treated in both batch and continuous operating modes over a period of 26 days. During the continuous operation, the air sparge rate was 450 std. $cm^3$/min, pressure was 3 atm. absolute, the liquid feed rate was 2.85 L/hr, the recycle rate was 4.12 L/min. and the recycle ratio was 86.7. Data in FIGS. 5 and 6 were obtained during the last 72 hours of continuous flow test period. Influent feed concentrations entering the system averaged 5.68 mM EDC. Effluents from the reactor averaged 0.009 mM EDC. With an influent flow rate of 2.85 L/h, the average removal rate was 1599 mg EDC/h (Molecular Weight EDC-98.96 g/mole). During this period, a carbon trap in series with the reactor off gas line adsorbed volatilized EDC at the rate of 4.84 mg/h, inferring that in excess of 99% of the observed removal rate was due to biodegradation. GC/MS analysis of an off gas sample collected downstream of the carbon trap just prior to removing it showed non-detectable levels of EDC, indicating that no organic breakthrough occurred.

Process conditions in the demonstration were purposely set to yield very high bilogical removal efficiencies. The high removal efficiency was realized to some extent at the expense of process productivity. To evaluate the maximum productivity of the process, the EDC concentration in the bubble column could be increased to a level at or just below the inhibition concentration of the culture (about 500 ppm). This condition can best be imposed by adjusting the feed concentration and/or flow rate to the reactor, while keeping the recirculation rate approximately constant. The operating pressure of the system may also need to be raised, to provide oxygen transfer rates sufficient to satisfy the increased respiration demand of the culture. Under these conditions, the removal rates can be increased significantly. Obviously, however, to some extent the effluent EDC concentration will increase, along with stripping losses.

The EDC was thus effectively decomposed, or dehalogenated, to produce essentially biomass, water and carbon dioxide.

It is apparent that various modifications and changes can be made without departing the spirit and scope of this invention.

Having described the invention, what is claimed is:

1. A process for the detoxification of an aqueous stream containing a toxic organic compound by microbial attack to biodegrade the toxic organic compound, and detoxify the liquid component of the stream, which comprises pretreating said toxic aqueous stream by dilution with water, as necessary, adding nutrients to optimize the concentration of the toxic organic compound and nutrient concentration, and adjusting temperature and pH, to condition the liquid stream for microbial attack on the toxic organic compound by microorganisms selected to biodegrade said toxic organic compound, sparging the conditioned liquid stream with an oxygen-containing gas to oxygenate said liquid stream, introducing said oxygenated liquid stream as an influent under pressure into a first zone at high gas shear, without agitation sufficient to strip any substantial amount of the toxic organic compound from the liquid stream, passing the oxygenated conditioned liquid stream under pressure through a second zone containing a fixed bed of a biocatalyst constituted of a porous carrier on which is attached, and immobilized, a microorganism selected to biodegrade said toxic compound at the conditions extant in said second zone, and removing from said second zone the liquid stream denuded at least in part of the toxic organic compound.

2. The process of claim 1 wherein the temperature in both the initial and second zones ranges from about 25° C. to about 35° C., the pH in both the initial and second zones ranges from about 6 to about 8, and the pressure in both the initial and second zones ranges from about 15 psig to about 50 psig.

3. The process of claim 2 wherein the temperature ranges from about 28° C. to about 32° C., the pH from about 6.8 to about 7.2, and the pressure from about 30 psig to about 40 psig.

4. The process of claim 1 wherein the oxygen-containing gas sparged into the liquid stream is air.

5. The process of claim 1 wherein the concentration of the oxygen in the liquid stream ranges from about 0.1 mg/L to saturation.

6. The process of claim 5 wherein the concentration of the oxygen in the liquid stream ranges from about 5 mg/L to about 6 mg/L.

7. The process of claim 1 wherein the microorganism immobilized on the solid carrier of the second zone is *Xanthobacter autotrophicus*.

8. The process of claim 1 wherein the microorganisms immobilized on the solid carrier of the second zone are selected from the group consisting of

| | |
|---|---|
| *Xanthobacter autotrophicus* | ATCC-43050 |
| *Pseudomonas fluorescens* | ATCC-55360 |
| *Pseudomonas cepacia* | ATCC-55362 |
| *Pseudomonas fluorescens* | ATCC-55361 |

9. The process of claim 1 wherein the toxic organic compound is selected from the group consisting of chlorinated aliphatics and chlorinated aromatics.

* * * * *